Aug. 3, 1954     A. J. KLOSE     2,685,421
AIRCRAFT NOSE MOUNTING FOR JET ENGINES
Filed Aug. 30, 1950
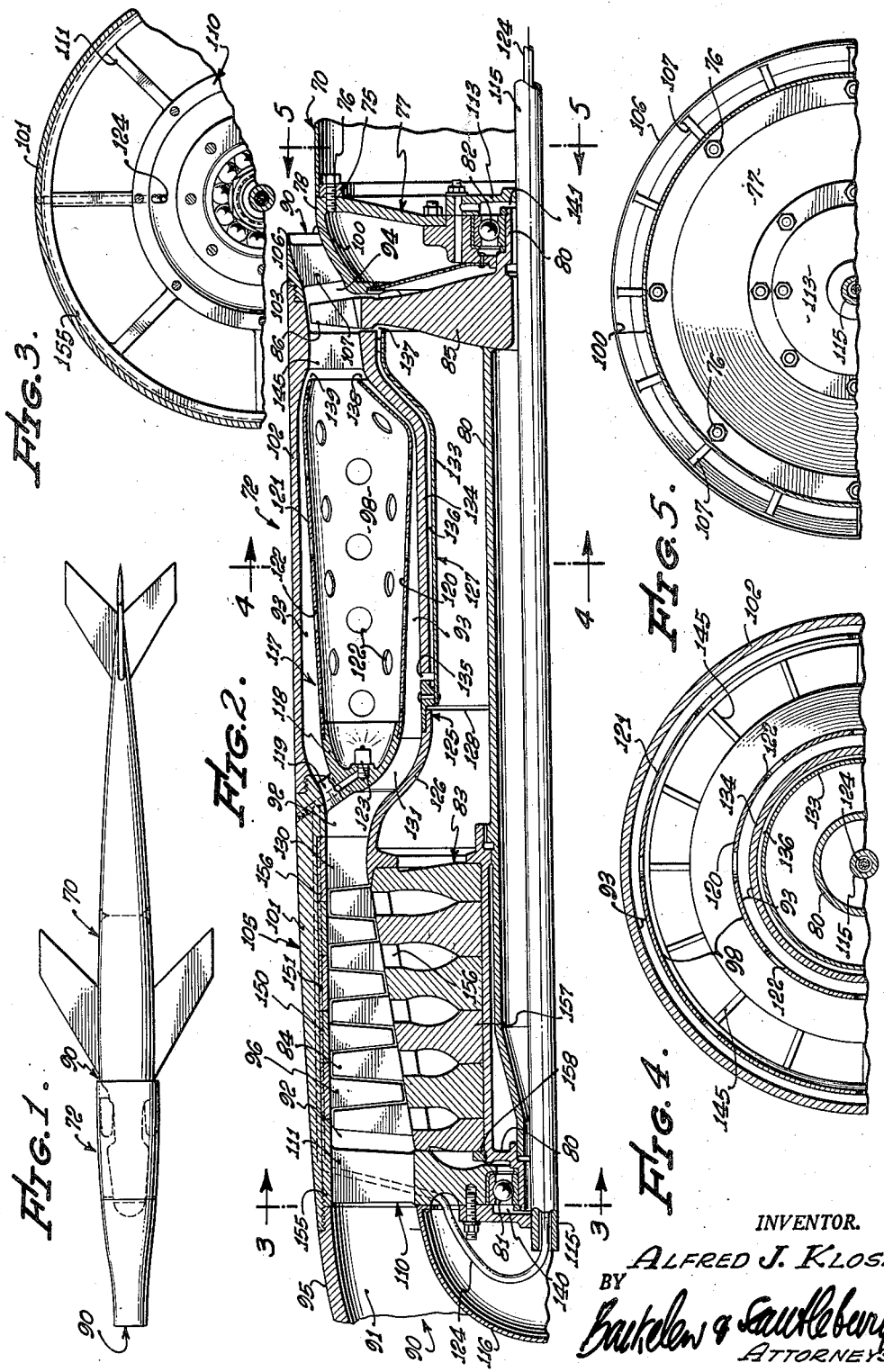
INVENTOR.
ALFRED J. KLOSE,
BY
Bartelew & Saulsbury
ATTORNEYS.

Patented Aug. 3, 1954

2,685,421

UNITED STATES PATENT OFFICE 2,685,421

AIRCRAFT NOSE MOUNTING FOR JET ENGINES

Alfred J. Klose, Rolling Hills, Calif., assignor to G. M. Giannini & Co. Inc., Pasadena, Calif., a corporation of New York Application August 30, 1950, Serial No. 182,343

1 Claim. (Cl. 244—74)

This invention has to do with improvements in the manner of mounting jet engines in aircraft, and with the adaptation of engines for such mounting.

Engines deriving propulsive power from rearwardly expelled jets of exhaust gases are ordinarily mounted either at the rear or toward the center of an aircraft fuselage, with the exhaust port, through which the jet is expelled, opening rearwardly along the longitudinal axis at or near the extreme rear of the fuselage. That has the serious disadvantage that either the entrance passage, through which air is conducted to the engine combustion chamber, or the exhaust passage, leading to the exhaust port, or both, extend longitudinally a major portion of the length of the fuselage, occupying valuable space and producing resistance to flow in those passages. Particularly when the engine is centrally placed, whatever space is left free by the engine assembly and the necessary ducts is divided into a plurality of relatively small compartments, reducing the convenience and efficiency with which that space can be utilized.

The present invention avoids those and other disadvantages of prior installations by placing the jet engine at the extreme forward end of the fuselage. The entire engine is preferably symmetrical with respect to the longitudinal axis of the fuselage, the air intake to the engine lying along that axis, and the engine exhaust port being distributed in an annular formation about the outer circumference of, and forward of the main body of, the fuselage. The exhaust port may be alternatively a succession of separate openings arranged spacedly around the cylindrical body of the fuselage, each opening being directed rearwardly; or a single annular aperture opening rearwardly between two generally cylindrical shells of different diameter.

A full understanding of the invention and of its further objects and advantages will be had from the following description of certain preferred embodiments. That description, and the accompanying drawings which form a part thereof, are illustrative, and are not intended to limit the scope of the invention. In the drawings:

Fig. 1 is a side elevation of a turbo-jet engine in accordance with the invention, mounted in the nose of a missile;

Fig. 2 is a fragmentary longitudinal axial section of the engine of Fig. 1, at enlarged scale; and Figs. 3, 4 and 5 are fragmentary transverse sections on the respective lines 3—3, 4—4 and 5—5 of Fig. 2.

Figs. 1 to 5 illustrate a typical embodiment of the invention in a turbo-jet engine installation in a missile or aircraft. The engine assembly 72 is mounted as a unit at the forward end of the fuselage proper, denoted by the numeral 70, and thus forms the forward end of the complete fuselage. The engine assembly is secured to the main body 70 of the fuselage entirely by the ring of bolts or studs 76, which join the base circular frame member 77 of the engine assembly to some suitable support structure of the fuselage, indicated at 75. Base member 77, together with plate 113, form a continuous bulkhead across the aircraft, which may be used as an effective fire wall.

The engine proper comprises the rotor shaft 80, mounted in forward and rear bearings 81 and 82, respectively, and carrying near its forward end a compressor structure 83 with compressor blades 84, and near its rearward end a turbine structure 85 with turbine blades 86.

A working fluid passage 90 through the engine is provided, including an entrance portion 91, enclosed by diffuser shell 95 and exposed to atmospheric air under ram pressure; a compressor portion 92, passing between compressor blades 84 and fixed blades 96; a combustion chamber portion 93, including the combustion chamber proper 98; and a turbine portion 94, passing between turbine blades 86. The working passage terminates at its rearward end in a rearwardly directed annular exhaust port 100, from which the jet of exhaust gas is discharged. The whole of working passage 90 in the present illustrative embodiment is of annular formation (except the forward part of entrance portion 91, which is circular) and is arranged concentrically about the longitudinal axis of the missile.

The outer wall of annular working passage 90 is formed by the cylindrical shell 105, extending from diffuser shell 95 at the extreme forward end of the entire structure to the faired rear edge 106 that forms the outer lip of exhaust port 100. Shell 105 is preferably, although not necessarily, constructed in three parts, apart from diffuser shell 95: a forward portion 101, surrounding primarily the impeller structure; an intermediate portion 102, surrounding primarily the combustion chamber and turbine; and a rear portion 103, surrounding the exhaust port 100. Shell 105, besides forming the outer wall of the working passage of the engine preferably also comprises the outer skin of the engine assembly, and thus forms the outer skin of the forward portion of the aircraft.

Shell 105 has the further important function of providing the primary structural support for the forward portion of the engine. Shell 105 is itself supported in fixed relation to cylindrical portion 78 of base frame member 77 of the engine by the main support fins 107, which extend radially across annular exhaust port 100. A forward frame member 110 is supported with respect to forward shell portion 101 as by forward support fins 111, which radially traverse the working passage 90 forward of combustion chamber 98, and, in the present preferred embodiment, also forward of compressor 83. Frame 110 supports forward bearing 81 of rotor shaft 80, which is accordingly supported from shell 105. Frame 110 also supports the forward end of the fixed tube 115, which extends the length of the engine proper inside the hollow rotor tube, providing convenient passage for oil and fuel lines, electrical cables and the like between the fuselage proper and the forward end of the engine assembly. Rear rotor bearing 82 is mounted on base frame member 77. That member also carries, by means of rear plate 113, the rear end of fixed axial tube 115.

Within combustion chamber portion 93 of working passage 90, a combustion chamber wall, generally designated 117, forms the annular combustion chamber proper 98. That wall 117 includes the forward section 118, of annular cup section, which is rigidly mounted by fins 119 on main shell 105; and inner and outer cylindrical walls 120 and 121, respectively, which are pierced by air inlet apertures 122. Fuel is introduced into combustion chamber 98 in any suitable manner, as by spraying from nozzles indicated at 123. A fuel line is indicated at 124, passing forward through tube 115, radially outward through a bore in a fin 111, and received by opposing semicylindrical grooves in the inner face of shell 105 and in the outer faces of compressor fixed blade rings 150 (see below).

The inner wall of annular working passage 90 is formed at its forward end by the generally conical fairing 116 that extends forward from the hub portion of forward frame member 110. The generally conical fairing 116 encloses a limited amount of space that may be utilized as desired, for example to house the warhead of a destructive missile. The entire interior of the fuselage proper, aft of the bulkhead formed by the engine structure at 77 and 113, is fully and uninterruptedly available, and can therefore be utilized with maximum efficiency. Between compressor 83 and turbine 85, the annular working passage 90 is inwardly bounded by a shell structure generally designated by the numeral 125 and comprising a forward section 126 and a rear section 127, preferably connected by an expansion joint as at 128. Forward section 126 is supported on forward shell portion 101 directly by fins 130, and indirectly by fins 131 which connect it to forward combustion chamber wall 118. The rear section 127 of inner shell structure 125 preferably comprises two radially spaced concentric shells, shown as an inner shell 133 of sheet metal and an outer shell 134 of thicker construction to provide increased heat conductivity. An aperture 135 in inner shell 134 admits cooling air from passage 93 to the annular passage 136 between shells 133 and 134, that air being discharged at the rear end of passage 136 through an annular gap 137 past turbine 85 into working passage 90. Inner and outer walls 120 and 121 of the combustion chamber proper are cooled over their entire length by air that is discharged through annular passages 138 and 139. Air passages 140 and 141 are provided through which cooling air may be circulated over the forward and rear bearings, respectively, that air passing the length of the rotor between hollow rotor shaft 80 and fixed tube 115.

The cylindrical or tapering portion 78 of ring member 77 preferably forms a flush forward continuation of the outer surface of the fuselage proper, the jet of exhaust gases being ejected rearwardly just outside of that surface. Unusually effective provision is made for cooling those parts of the structure that are exposed to the heat of the exhaust gases. The walls of working passage 90 immediately to the rear of the combustion chamber are relatively thick. Heat is thus conducted rapidly away from the passage walls and from fins 145. Heat is carried inwardly and forwardly along wall 134 and dissipated to the air streams in passages 93 and 136. Heat is also conducted outwardly and forwardly through shell portion 102, and is radiated from the outer surface of that shell, and, more particularly, is conducted away from that surface by the very rapid flow of atmospheric air along the outer surface of the missile. Because the wall of the working chamber is integral with the outer wall of the missile, the heat from the combustion chamber is removed far more rapidly and effectively by the illustrated structure than in previous arrangements which depend for cooling upon internal air ducts in which the rate of flow is necessarily relatively slow.

Turbine blades 86 are also cooled very considerably by radiation from their surface to the relatively cool passage walls surrounding them, particularly the outer wall formed by shell 105. Furthermore, the illustrated placement of turbine blades 86 relatively close to exhaust port 100 has the very beneficial result that the port subtends a relatively wide solid angle at the blade surface, providing a window through which the blades radiate their heat energy directly to the cool surroundings completely outside of the missile. That latter type of cooling (in addition to highly effective cooling by conduction) is also especially effective for the structural fins 107.

By thus providing peculiarly effective cooling of those structural elements that are exposed to hot gases from the combustion chamber, the preferred arrangement permits the engine to be safely operated at higher temperatures and hence at higher power levels than would otherwise be feasible.

The preferred manner of constructing the compressor assembly, illustrated in Fig. 2, has the advantage of facilitating the presentation of a smooth outer skin to the surrounding atmosphere with a minimum of space outside of the working fluid passage. Fixed blades 96 are arranged in circular tiers, the blades of each tier being mounted on a continuous ring 150. The rings 150 are received successively in a cylindrical bore 151 in shell portion 101, and are held firmly in assembled position in the bore by diffuser shell 95, which is threaded into the forward end of shell 101 and acts as a retaining ring. The structural fins 111 and 130 are preferably mounted on respective rings 155 and 156, with which they may be integral, and which are assembled in the same bore 151 in shell 101, forward and aft, respectively, of blade-supporting rings 150.

The moving blades 84 of the compressor assembly are formed on stems 156 of rectangular section, which are firmly clamped between mounting disks 157. The latter disks are locked on the forward portion of rotor shaft 80, as by retaining ring 158.

With the arrangement of parts just described, the successive tiers of fixed and moving blades are assembled alternately from the forward end of the engine. Since each of the rings 150 is a unitary structure, in contrast to the previous practice of mounting the fixed blades on semicylindrical shells that must be externally bolted together, the outer shell 101 may fit closely about the working passage 90, and presents a smooth unbroken outer surface to the surrounding air.

With relation to the illustrative embodiment described above, the whole assembly can be considered, for descriptive purposes and for claim definition, from either of two viewpoints. The engine may be considered to form the extreme forward portion of the fuselage, with the external element 55 or 105 of the engine forming a forward part of the faired outer surface of the fuselage; or the fuselage body may be considered to terminate at the rearward portion of the engine assembly, that assembly being then considered to be mounted on the forward end of the fuselage.

I claim:

In combination with an aircraft having an elongated fuselage, a turbo-jet engine assembly mounted at the forward extremity of the fuselage proper, said engine assembly including a rotor shaft rotatably mounted in forward and rear journals and carrying compressor blades near its forward end and turbine blades near its rear end, structure forming an annular air passage extending between the compressor blades and the turbine blades, a circular frame member supporting the rear journal and mounted on the fuselage, and supporting structure for the forward journal comprising a cylindrical metal shell enclosing the compressor blades and the turbine blades and extending forwardly of the former and rearwardly of the latter, the cylindrical shell forming the outer wall of the annular air passage, a plurality of fins extending across the air passage rearwardly of the turbine blades between the said circular frame member and the cylindrical shell and comprising the sole support for the latter, and frame means including a plurality of fins extending across the air passage forwardly of the compressor blades between the cylindrical shell and the forward journal and comprising the sole support for the latter, the said cylindrical shell forming an outer wall of the aircraft and providing, throughout a region of appreciable longitudinal extent adjacent and forward of the turbine blades, a continuous metal path for transverse heat flow from the air passage directly to the atmosphere surrounding the aircraft.

References Cited in the file of this patent

UNITED STATES PATENTS

| Number | Name | Date |
| --- | --- | --- |
| 1,288,360 | Zaar | Dec. 17, 1918 |
| 2,396,911 | Anxionnaz | Mar. 19, 1946 |
| 2,405,164 | Pavlecka | Aug. 6, 1946 |
| 2,409,177 | Allen et al. | Oct. 15, 1946 |
| 2,452,782 | McLeod et al. | Nov. 2, 1948 |
| 2,464,724 | Sedille | Mar. 15, 1949 |
| 2,469,439 | Lundquist | May 10, 1949 |
| 2,526,410 | Price | Oct. 17, 1950 |
| 2,548,886 | Howard | Apr. 17, 1951 |
| 2,575,682 | Price | Nov. 20, 1951 |
| 2,592,119 | Chilton | Apr. 8, 1952 |

FOREIGN PATENTS

| Number | Country | Date |
| --- | --- | --- |
| 767,816 | France | May 7, 1934 |